United States Patent Office 3,523,926
Patented Aug. 11, 1970

3,523,926
RUBBER VULCANIZATION AGENTS AND
METHODS FOR THEIR PREPARATION
Stanley B. Mirviss, Stamford, Conn., assignor to Stauffer
Chemical Company, New York, N.Y., a corporation of
Delaware
No Drawing. Filed Nov. 8, 1967, Ser. No. 681,573
Int. Cl. C08f 27/06; C08c 11/54; C08g 33/00
U.S. Cl. 260—79
6 Claims

ABSTRACT OF THE DISCLOSURE

Superior vulcanization agents for rubber are prepared by heating conjugated diolefins with sulfur in the presence of catalytic amounts of amines.

BACKGROUND OF THE INVENTION

This invention relates to novel vulcanization agents for rubber and methods for their preparation, and also to the resulting vulcanizates which comprise a major proportion of rubber and a minor proportion of these agents. More particularly, the invention concerns a novel process for the preparation of rubber curing agents which in turn provide rubbers having improved tensile strength, hardness and modulus values.

SUMMARY OF THE INVENTION

The new method of this invention in its broader aspects comprises heating together at a temperature of from about 100° to about 250° C. between about 3 and about 50 parts by weight of sulfur and one part by weight of a diolefin, in the presence of a catalytic amount, up to about 10% by weight of the mixture, of an amine. The vulcanizing agent thus obtained may be isolated from the system or, preferably, the entire reaction product may be combined in situ with either natural or synthetic rubber and subjected to standard cure conditions to obtain novel low-bloom vulcanizates. In these products the amines are a key component. They are not just catalysts for the preparation of the curing agent, i.e. the copolymer of diolefin and sulfur. They are also catalysts, or co-curing agents, with the copolymer in making the ultimate vulcanizate. The copolymer is a sulfur donor source for making the crosslinks, i.e. for the vulcanization.

DETAILED DESCRIPTION OF THE INVENTION

As hereinbefore indicated, the useful temperature range is generally from about 100° to 250° C. Below 100° C. there may be insufficient reaction and above 250° C. too many side reactions may occur. Obviously the particular temperature chosen is interdependent with the time of heating, and the time:temperature relationship for any particular reaction system can be readily determined by those skilled in this art. Similarly, the precise quantity of the amine catalyst or co-curing agent will depend upon the choices and relative proportions of sulfur and diolefin in conjunction with the times and temperatures of heating which are desired to effect the interpolymerization. Generally, no more than about 10% of amine by weight of the reaction mixture is necessary. Preferably an amount of amine somewhere between 0.2 and 5% by total weight, reaction temperatures substantially between 150° and 230° C. and ratios of about 5 to 45 parts by weight of sulfur per part of diolefin are employed. Elemental sulfur is the preferred form of this component of the interpolymers. The polymerization may be carried out with or without inert diluents. If a diluent is used, it is preferably one that is easily removed later, such as benzene, heptane, carbon tetrachloride, toluene and the like.

The most useful diolefins are those which are linear or cyclic conjugated compounds, such as piperylene, butadiene, isoprene (2-methyl-butadiene), 2,3 - dimethylbutadiene, cyclopentadiene, cyclohexadiene-1,3, cyclooctadiene-1,3, 1-vinylcyclohexene, 1-phenylbutadiene, 1,4-diphenylbutadiene, chloroprene, 1-methoxybutadiene, heptadiene-2,4, etc. As will be apparent to those skilled in the art, other olefins can also be selected which, while not themselves conjugated, will crack to form a conjugated diolefin under the particular heating conditions employed. For instance, one of the preferred reactants of this invention is the dimer of cyclopentadiene, i.e. dicyclopentadiene, which on heating above about 100° C. cracks to form cyclopentadiene which then reacts with the sulfur.

The amine catalyst chosen may be varied widely. It may be either primary, secondary or tertiary, and it may be either alkyl or aryl substituted or both. In its broader aspects, the invention contemplates the use of amines of the general formula

where R, R' and R" may be the same or different and may be aryl, alkyl (cyclic or acyclic), arylalkyl, and/or alkylaryl, and any one or two of R, R' and R" may be hydrogen. Especially preferred are dimethylamine, ethylamine, aniline, dimethylaniline, pyridine, piperidine, diisopropylamine, tertiary butylamine, triethylamine, tertiary octylamine, octadecylamine, ethylenediamine, tetramethyl ethylenediamine, propylene diamine, naphthylamine, N-methyl naphthylamine, N,N-dimethyl benzylamine, cyclohexylamine, and the like.

The curing agents prepared by the new process comprise interpolymers of an entirely different class from those heretofore known. They range from brown viscous oils to horny resins, depending upon the relative proportions of sulfur and diolefin. Of course the solid resins must flow when incorporated into the rubber. Either natural or synthetic rubbers are advantageously vulcanized by conventional curing techniques utilizing minor proportions of the new curing agents. Rubbery materials in the vulcanization of which these curing agents are particularly useful are styrene-butadiene rubber (SBR), polybutadiene, polyisoprene (synthetic), natural rubber, and other polydiolefin or poly-olefin-diolefin copolymer rubbers. To these rubbers are generally added proportions of curing agent ranging from approximately 0.25 to 10 parts per one hundred parts by weight of rubber, and preferably from about 1.0 to 6.0 p.p.h. Vulcanization times and temperatures as well as other conditions are generally those well known in the art and of course depend on the type of rubber and its intended use.

The vulcanizates resulting from the use of these curing agents comprise broadly a major proportion of the rubbery material and from about 0.25 to 10 parts per hundred parts by weight thereof of the sulfur:diolefin interpolymer containing the amine. As previously indicated, this type of interpolymer is a novel one. Of course, curing agents consisting of olefins or diolefins and sulfur are known in the prior art. For instance, U.S. Pat. No. 2,989,513 teaches them. However, it claims only olefins and there is no mention of amines, which are key ingredients of the interpolymers of this invention. When representative curing agents taught by the patentees are compared with the agents of this invention, it is found that the presence of the amine markedly improves tensile strength, modulus and Shore hardness without substantially altering scorch values or cure index. Thus, the amines clearly play a unique role in the vulcanization as well as probably a role in the prior reaction between the sulfur and the diolefins.

The following examples are given to illustrate this invention but not in any way to limit its scope.

Note: In these examples "SBR" denotes styrene-butadiene rubber; "MBT" is mercaptobenzothiazole; and "DPG" is diphenylguanidine. The scorch, cure, 300% modulus, tensile strength and hardness data reported were obtained by standard test methods. The vulcanizates were prepared in each instance by milling together the rubber stock, the particular curing agent under study and other conventional ingredients, and curing the resulting blend at about 292° F. for 30 minutes.

Example I

One hundred ninety-two grams of elemental sulfur and 34 grams of isoprene (molar proportions of 12:1) were heated together for five hours in a conventional autoclave bomb at 150° C. (skin temperature) and 135° C. (internal temperature) and then slowly cooled. The bomb was opened and the red-brown polymer removed and separated from unreacted sulfur by benzene extraction. Of 9.9 grams of total product, 5.3 grams were sulfur and 4.6 grams were the polymer. This latter was designated "Control."

The same quantities of sulfur and isoprene were again mixed in the reaction bomb and this time 2 grams (about 0.85% by weight) of "Amine 100" were added. This commercially available material (Richardson Co.) is a dimethyl-substituted, long chain aliphatic tertiary amine of about 300 molecular weight. The reaction was carried out for 5½ hours. The skin temperature reached the 146–158° C. range within 15 minutes and remained in that range for the duration of the heating operation. The internal temperature rose rapidly to 113° C. in the first half hour, and rose gradually over the next hour to 134–136° C. where it remained for the duration of the heating cycle. The cool-off period was 5 hours, and an exotherm in the 73–78° C. range was noted. The bomb was opened easily. There was no pressure and the odor of $H_2S$ was very strong. The product was a red-brown paste.

The Control polymer was used to prepare a vulcanizate by mixing 10 parts by weight of it with 588 parts of a rubber masterbatch, 2.4 parts MBT and 1.6 parts DPG. The masterbatch consisted of 1080 grams SBR: 32 grams zinc oxide: 16 grams stearic acid; 8 grams phenolic antioxidant ("Agerite Stalite S"). The amine-containing polymer was used to prepare a second vulcanizate by admixing 10 parts by weight of it, 588 parts of the same rubber masterbatch, 2.4 parts MBT and 1.6 parts DPG.

The comparative test results on these two vulcanizates are given below. They clearly demonstrate the markedly improved tensile strength and greater modulus value achieved when the amine-containing interpolymer was employed as the vulcanizing agent.

autoclave for 5½ hours. The skin temperature remained in the 140–145° C. range. The internal temperature rose to 125° C. after 1½ hours and remained there. When the reaction was stopped, rocking of the bomb was continued for two hours until cool (50° C.). The bomb was opened with difficulty as the product was a hard solid. The odor characteristic of dicyclopentadiene was noted while the odor of $H_2S$ was absent. The product was a brown, homogeneous gum having some sulfur crystals on the upper cooling surface. This polymer was designated "Control."

The same quantities of the cyclopentadiene dimer and sulfur were again reacted under the same conditions for 5½ hours but this time in the presence of 2 grams of the "Amine 100" catalyst. The skin temperature reached the 146–153° C. range within 15 minutes and remained there for the duration of the heating cycle. The internal temperature showed a steady rise to 120° C. during the first half hour, a plateau at 120–122° C. for the next half hour and a gradual rise to the 130–132° C. range over the next half hour, remaining in this range for the duration of the heating cycle. It then took 4 hours for the reaction product to cool off. The bomb was opened and no pressure was noted. There was no odor of hydrogen sulfide, but the odor of olefin was detected. The product was red-brown and hard. It was very slowly dissolved in carbon disulfide. The resulting solution was then poured into an evaporating dish and the carbon disulfide allowed to evaporate. When all the carbon disulfide had evaporated, the polymer was chopped up in a Waring blendor and submitted for vulcanization testing.

Vulcanizates were prepared using 10 parts by weight of the polymer, 620 parts of rubber masterbatch, 2.4 parts MBT and 1.6 parts DPG. This masterbatch consisted of equal parts by weight of SBR and #1 Pale Crepe (natural rubber), 40% of carbon black by weight of the mixed rubbers, 8% of an oil softener and extender ("Circosol 4240"), 4% zinc oxide, 2% stearic acid and 1% of an antioxidant. Test results were as follows:

| Sample | Scorch | Cure | Cure Index | 300% modulus (p.s.i.) | Shore hardness | Tensile strength (p.s.i.) |
|---|---|---|---|---|---|---|
| Control | 20 | 23.5 | 3.5 | 960 | 47 | 3,315 |
| With amine | 22 | 26 | 4 | 1,135 | 50 | 3,620 |

When the same reaction is repeated twice more, in the first instance using 0.5 gram of the "Amine 100" (about 0.2% by weight of the reaction mixture) and in the second case using 12 grams of this amine (about 5.25% by total weight), interpolymers are obtained of substantially similar character to the product containing 2 grams of the amine.

Example III

By the procedures of Examples I and II, a mixture of 12 moles of sulfur and 1 mole of cyclopentadiene monomer was heated for 5 hours at 130° C. in a bomb in the presence of 10 grams of tributylamine. The product was used to cure a polybutadiene rubber in the manner described in Example II with the same beneficial results as in Example II.

| Sample | Scorch | Cure | Cure index | 300% modulus (p.s.i.) | Tensile strength (p.s.i.) | Shore hardness |
|---|---|---|---|---|---|---|
| Control | 14 | 19 | 5 | 1,065 | 3,240 | 50 |
| With amine | 14 | 18 | 4 | 1,130 | 3,435 | 52 |

When the same proportions of sulfur, isoprene and amine are mixed and reacted under the same conditions but at 220–235° C. for three hours, substantially the same interpolymer results.

Example II

A 24:1 molar ratio of sulfur to diolefin was obtained by mixing together 192 grams of sulfur and 33 grams of dicyclopentadiene. This mixture was reacted in the Example IV Again the procedures of Examples I and II were carried out, using one mole of dimethyldicyclopentadiene and 24 moles of sulfur and heating at 200° C. for 3 hours in the presence of ethylene diamine. The product was used to cure a 50% natural rubber, 50% SBR mixture in a masterbatch similar to that of Example I. A vulcanizate resulted having improved physical properties when compared to a vulcanizate prepared from the same masterbatch and the diene-sulfur product made without an amine present.

Example V

A mixture of 1 mole of piperylene and 12 moles of sulfur was heated for 6 hours at 135–145° C. in an autoclave with 15 grams of cyclohexylamine and then cooled down. The product was removed and used as a curing agent for a natural rubber masterbatch. A vulcanizate with improved physical properties was again obtained.

Example VI

The procedure of Example V was followed and comparable results were obtained by replacing the piperylene with 4-vinylcyclohexane and the cyclohexyl amine with diisopropylamine.

What is claimed is:
1. The method of preparing a vulcanizing agent for natural and synthetic rubbers which comprises heating together at a temperature of from about 100° to about 250° C. between about 3 and about 50 parts by weight of sulfur and one part by weight of a conjugated diolefin, in the presence of a catalytic amount, up to about 10% by weight of the mixture, of an amine.
2. The method of claim 1 wherein the conjugated diolefin is cyclopentadiene.
3. The method of claim 1 wherein the conjugated diolefin is isoprene.
4. The method of claim 1 wherein the amine is a dimethyl-substituted tertiary amine.
5. The method of claim 1 wherein between about 5 and 45 parts by weight of elemental sulfur per part of diolefin and between about 0.2 and 5.0% by total weight of amine are used and the mixture is heated to from about 150° to 230° C.
6. The amine-containing interpolymer prepared by the process of claim 1.

References Cited

UNITED STATES PATENTS

| 2,989,513 | 6/1961 | Hendry et al. | 260—79 |
| 3,259,598 | 7/1966 | Solomon | 260—23 |
| 3,264,239 | 8/1966 | Rosen et al. | 260—23.7 |

OTHER REFERENCES

Hoffman, W.: Vulcanization, Palmerton, N.Y., 1965, pp. 182–185.

JOSEPH L. SCHOFER, Primary Examiner

C. A. HENDERSON, JR., Assistant Examiner

U.S. Cl. X.R.

260—5, 45.95, 79.5, 139, 775, 795, 798, 887